United States Patent
Geber et al.

(10) Patent No.: US 6,580,353 B1
(45) Date of Patent: Jun. 17, 2003

(54) ELECTRONIC SAFETY SYSTEM HAVING AN AUTHENTICATION ELEMENT RANGE DETERMINATION, PARTICULARLY A VEHICLE LOCKING SYSTEM

(75) Inventors: Michael Geber, Bad Urach (DE); Jörn-Marten Ohle, Leonberg (DE); Andreas Pohlmann, Weil der Stadt (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,012

(22) Filed: Mar. 6, 2000

(30) Foreign Application Priority Data

Mar. 6, 1999 (DE) .......................... 199 09 932

(51) Int. Cl.$^7$ .......................... G05B 19/00; G06F 7/00; H04B 1/00
(52) U.S. Cl. .................. 340/5.61; 340/5.63; 340/5.6; 340/5.72
(58) Field of Search ................. 340/5.61, 5.6, 340/5.72, 570.11, 545.2, 5.63, 5.65, 825.69, 825.72, 10.4, 5.62

(56) References Cited

U.S. PATENT DOCUMENTS 4,462,022 A * 7/1984 Stolarczyk .................. 340/506
5,144,667 A * 9/1992 Pogue, Jr. et al. ............ 340/45

FOREIGN PATENT DOCUMENTS

| DE | 195 42 441 C2 | 4/1998 |
|---|---|---|
| DE | 197 18 764 | 8/1998 |
| DE | 198 11 572 | 8/1999 |
| DE | 198 27 586 | 12/1999 |
| EP | 0 427 342 | 5/1991 |
| JP | 11-78787 | * 3/1999 |

* cited by examiner

Primary Examiner—Michael Horabik
Assistant Examiner—Vernal Brown
(74) Attorney, Agent, or Firm—Crowell & Moring LLP

(57) ABSTRACT

An electronic safety system, particularly a vehicle locking system, has several safety units arranged on an object to be secured, at least one authorizing authentication element, and safety control devices with several object-side authentication element detection sensors. Signal sending devices emit a query data signal in a pertaining acquisition range, which can be received by an authentication element situated in the corresponding acquisition range. The authentication element has devices for returning an authentication response signal. According to the invention, the query data signals emitted by the detection sensors contain a sensor-specifically coded data protocol range, and the authentication element has devices for analyzing the sensor-specifically coded data protocol range of received query data signals and for generating an authentication response signal which contains a sensor-indicative data protocol range which is coded with the information as to from which detection sensors the authentication element has received a query data signal.

8 Claims, 2 Drawing Sheets

ELECTRONIC SAFETY SYSTEM HAVING AN AUTHENTICATION ELEMENT RANGE DETERMINATION, PARTICULARLY A VEHICLE LOCKING SYSTEM

BACKGROUND AND SUMMARY OF THE INVENTION

This application claims the priority of German Patent Document 199 09 932.4, filed Mar. 6, 1999, the disclosure(s) of which is expressly incorporated by reference herein.

The invention relates an electronic safety system, and in particular, a vehicle locking system.

In safety systems having one or more safety units for protection against unauthorized entry by way of entry elements (doors and the like), or against unauthorized use of vehicles and other objects, a control unit generates safety control commands based on its determination (using pertaining detection sensors) of whether or not an authorized authentication element is situated within its acquisition range. In so-called keyless go systems, active authentication element operation by the user is not required; rather, the user needs only bring the authentication element into the acquisition range of a detection sensor.

The authentication element in this case may consist, for example, of a chip card. For detecting an authentication element, the control unit emits query data signals into the acquisition range via the detection sensors. (The acquisition range is frequently defined by the capture range of an antenna unit of the particular detection sensor.) When an authentication element is situated within the acquisition range of one or more detection sensors, it receives the query data signal and returns an authentication response signal, from which the control unit can determine that the authentication element is situated within an acquisition range, and in which of the acquisition ranges, (that is, of which sensor(s)) and whether it is valid for the particular object. The safety control devices will then generate safety control commands for releasing or blocking one or more of the safety units as a function of the acquisition ranges within which the authorizing authentication element has been detected. Such systems are customary, for example, for use as locking systems and/or drive blocking devices in motor vehicles. A vehicle locking system of this type is described in the older German Patent Application No. 198 39 355 which is not prior art.

In modern vehicles, one problem of conventional keyless go systems of this type is that the acquisition ranges of the individual detection sensors and the capture ranges of their antenna units partially overlap (among other reasons, for avoiding undesirable dead zones). Such a motor vehicle anti-theft system with mutually overlapping acquisition ranges formed of capture ranges of different antenna units is disclosed in German Patent Document DE 195 42 441 C2. Since, on the other hand, frequently different safety control commands should be generated as a function of whether an authorizing authentication element exists only in one or only in the other acquisition range, it is desirable that these different authentication element positions can be differentiated.

Conventionally, this task can be accomplished, for example, by first querying one acquisition range concerning the presence of an authentication element and, if the result is positive, then querying the other acquisition range which partially overlaps with the former. In this manner, the control unit can decide whether or not the authentication element detected in one acquisition range, is also situated in the other acquisition range, and thus in the overlapping range.

However, such sequential querying of several acquisition ranges concerning an authentication element which may be situated there is relatively time consuming and may, in unfavorable cases, lead to undesirable delays in the implementation of safety function desired by the user. In addition, such multiple sequential query of different detection sensors results in separate responses to each of these sensors by the addressed authentication element. Since the query by the detection sensors usually takes place several times, a conventional authentication element searching operation includes a relatively large number of authentication response signals sent by the authentication element. The process therefore causes a corresponding energy consumption in the authentication element, and, for example, shortens the useful life of its battery.

One object of the invention is to provide an electronic safety system of the initially mentioned type (for example, in the form of a keyless go system), which accomplishes a relatively rapid determination of the various acquisition range or ranges within which an authentication element may be situated.

This and other objects and advantages are accomplished by the electronic safety system according to the invention, in which the query data signals emitted by the detection sensors characteristically contain a data protocol field coded with sensor-specific identification information (hereinafter, "sensor-specifically coded"), that, clearly identifies the emitting detection sensor and differentiates it from the others. The respective authentication elements have devices for analyzing the sensor-specifically coded data protocol fields of received query data signals, and generate and send back an authentication response signal which contains a sensor-indicative data protocol field containing information identifying detection sensor or sensors from which a query data signal has been received.

The safety system according to the invention thus permits a comparatively short searching operation by the control unit for an authentication element present in one of the acquisition ranges. In addition, it also keeps the energy consumption in the respective authentication element relatively low, because in a searching operation the safety devices emit query data signals by way of the detection signals, which query data signals carry information in the sensor-specifically coded data protocol field indicating from which detection sensor they originate. An authentication element situated within the acquisition ranges of one or more detection sensors receives the query data signals of those detection sensors. By means of its corresponding analyzing devices, the authentication element can extract from the received query data signals information concerning identity of the sending detection sensor. The authentication element then incorporates all information indicating the detection sensors from which it has received query data signals into the authentication response signal to be sent. From this single authentication response signal, the control unit receives (in addition to possible other information), sufficient information, which it can analyze indicating from which detection sensors the authentication element could receive query data signals. That is, it can determine the different partially mutually overlapping acquisition range(s) within which the authentication element is situated.

Since the length of the sensor-specifically coded data protocol field to be incorporated into the query data signals can be kept significantly shorter than the residual length of the query data signals which comprise particularly the actual protocol part for checking the authentication, the authentication element searching operation can be kept correspondingly shorter in comparison to conventional systems with the serial query of the various acquisition ranges. In addition, the energy consumption in the authentication element for generating a single authentication response signal per searching operation according to the invention is lower than in cases in which the authentication element, if it is situated in an overlapping range of several acquisition ranges, must in each case emit a separate authentication response signal to the serial queries of the detection sensors of these acquisition ranges.

In one embodiment of the invention, the sensor-specific code information consists of an identification data block which, for the different detection sensors, is situated at different points within the sensor-specifically coded data protocol field, and is therefore suitable for the clear identification of the sending detection sensor in a simple manner.

In another embodiment, the different identification data blocks are situated without any overlapping at mutually separated points within the sensor-specifically coded data protocol field the query data signals. The sensor-indicative data protocol field of the authentication response signal is then built up in real time from the identification block data of the received query data signal (s). That is, corresponding sensor-identifying data blocks are built up at that point within the sensor-indicative data protocol field at which the pertaining identification data block was situated in the sensor-specifically coded data protocol field. Since the identification data blocks are situated at mutually separated points, they can still be identified individually in the sensor-indicative data protocol field in which the authentication element is situated in an overlapping range of several acquisition ranges, and therefore several identification data blocks are in a time-corresponding manner built into the sensor-indicative data protocol field of the authentication response signal. As the result of this relatively simple structure of the sensor-specifically coded data protocol field of the query data signals of different detection sensors as well as the sensor-specifically coded data protocol field of the authentication response signal, the implementation expenditures can be kept relatively low.

Other objects, advantages and novel features of the present invention will become apparent from the following detailed description of the invention when considered in conjunction with the accompanying drawings.

DETAILED DESCRIPTION OF THE DRAWINGS

Figure 1:
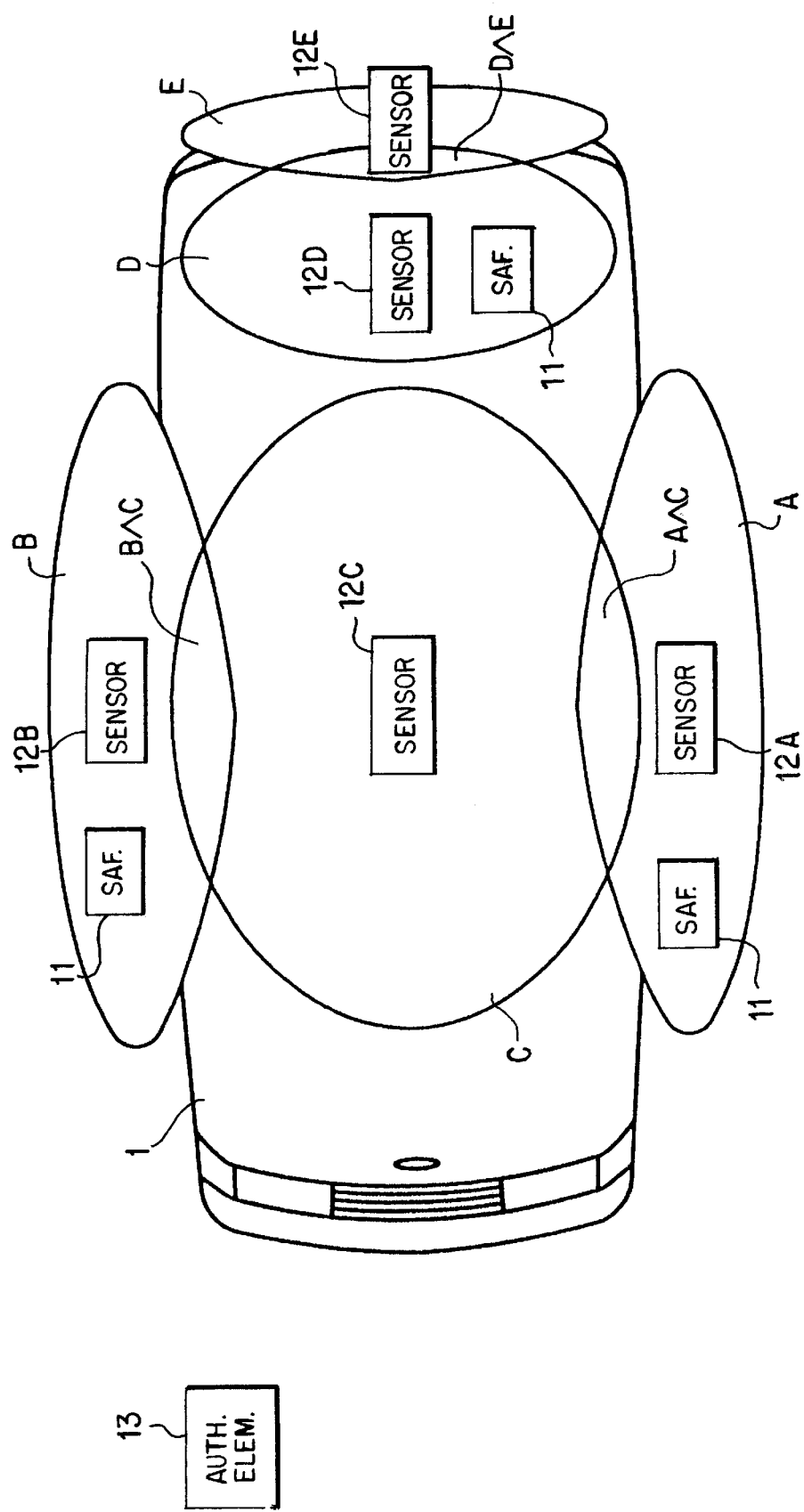
FIG. 1 is a schematic top view of an automobile with schematically illustrated acquisition ranges of authentication element detection sensors of an electronic vehicle locking system.

FIG. 1 is a schematic view of an automobile 1 with a safety system designed in the form of a keyless go lock system. The locking system contains in a conventional manner (not shown in detail) one locking unit 11 (safety unit) on each vehicle door and on a trunk lid, and suitable locking control devices assigned to the locking units. The locking control devices generate the required locking control commands to change over the different locking units between a locked state in which they block the opening of the pertaining entry element (that is, a door or the trunk lid), and an unlocked condition, in which they release the entry element when a corresponding opening operating element (such as a door handle or the rear lid opening button), is actuated by the user.

The access authorized vehicle user or users carry a correspondingly vehicle-specifically coded authentication element along with them, for example in the form of a chip card. Their authorization for the vehicle is checked by an authentication operation via wireless data communication between the on board vehicle locking control devices and the authentication element (for example, by way of a radio path in the frequency band about 433 MHz).

According to the keyless go operating technique, an authentication communication between the locking control devices and an authentication element 13 takes place automatically if authentication element is situated within a definable acquisition range of detection sensors of the locking control unit provided for this purpose. The authentication element detection sensors are also of a conventional construction and typically contain one antenna unit whose so-called capture range determines the acquisition range. The locking control devices emit a query signal via the antenna unit covering the acquisition range, and transmitted authentication response signals are received.

The considered embodiment in FIG. 1 has a first detection sensor 12A with a first antenna whose capture range forms a first acquisition range A covering mainly the area in the vicinity of the driver side; a second detection sensor 12B with a second antenna whose capture range forms a second acquisition range B covering mainly the area of the front passenger side; a third detection sensor 12C with a third antenna whose capture range forms a third acquisition range C covering mainly the vehicle passenger compartment; a fourth detection sensor 12D with a fourth antenna whose capture range forms a fourth acquisition range D covering mainly the trunk; and a fifth detection sensor 12E with a fifth antenna whose capture range forms a fifth acquisition range E covering mainly a rearward trunk lid area. By means of the third, vehicle-occupant-compartment-related detection sensor 12C, it can be detected, in particular, whether a vehicle user with an authorizing authentication element is seated in the vehicle; this information can also be utilized for the locking system function for an analog keyless go triggering of an electronic drive blocking device. By means of the fourth, trunk-related detection sensor 12D, an authentication element which was possibly accidentally placed in the trunk can be detected. In this manner, it is possible to avoid accidentally locking an authorizing authentication element in the trunk.

As indicated as an example and schematically in FIG. 1, the vehicle-occupant-compartment-related, third acquisition area C overlaps laterally, on the one hand, with the driver-side first acquisition range and, on the other hand, with the front-passenger-side, second acquisition range B forming corresponding overlapping ranges $A^+C$ and $B^+C$. In addition, the fourth, trunk-related acquisition range D overlaps with the rear-lid-related, fifth acquisition range E forming a corresponding overlapping range $D^+E$.

Since it is desirable, depending on the area inside the vehicle 1 and in the vehicle surroundings in which an authorizing authentication element is situated, that different locking control commands (and optionally also different drive blocking commands) are generated, it is necessary that the vehicle-side locking (and optionally drive blocking) control units are able to determine whether, and possibly in which acquisition range(s) A to E, an authorizing authentication element is situated. The illustrated system achieves this in a relatively simple manner by a special format of the data protocols of the query data signals emitted by the detection sensor antennas and of the authentication response signal returned by respective authentication elements, as explained below for an advantageous embodiment with reference to FIG. 2.

Figure 2:
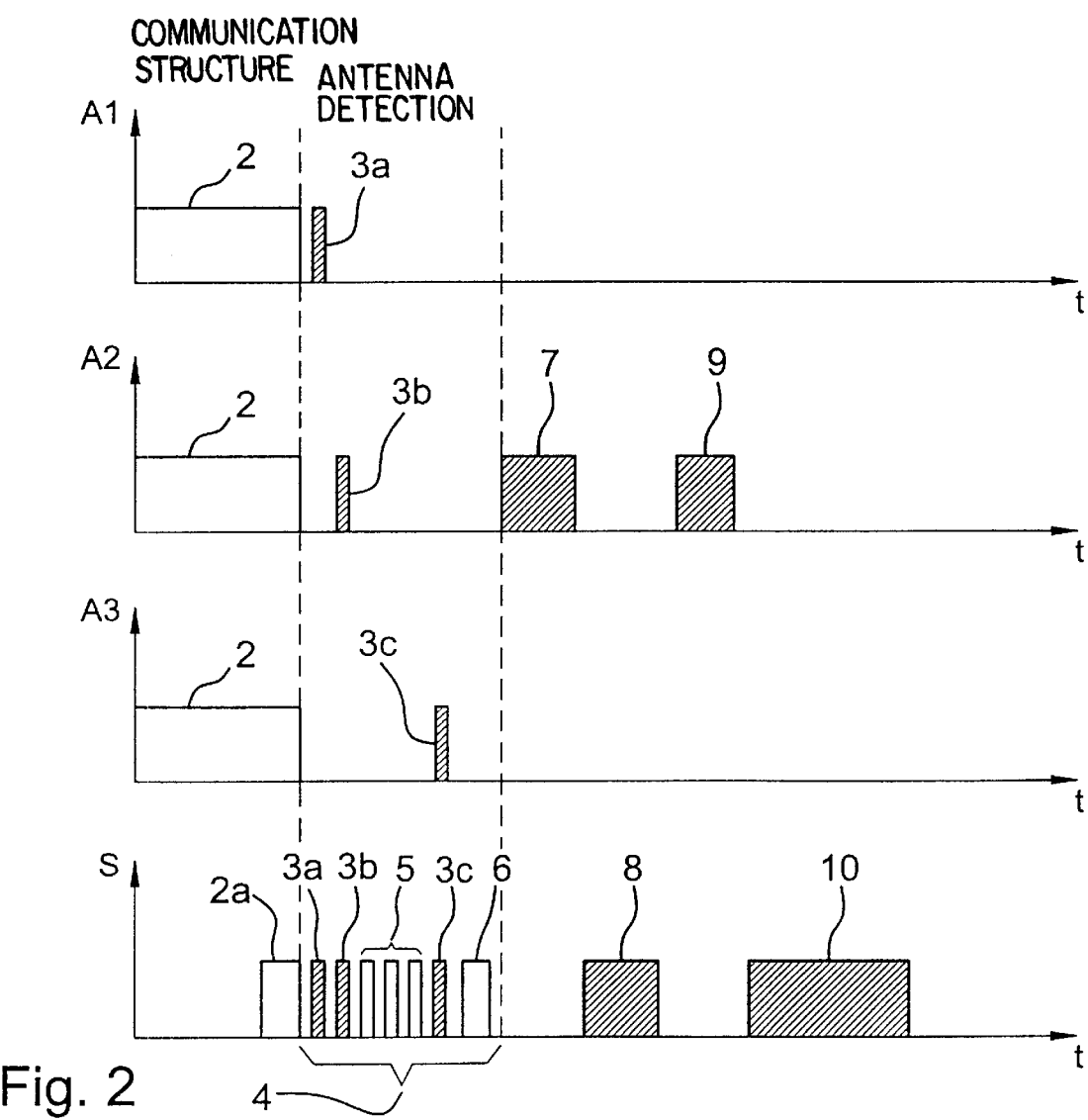
FIG. 2 is a schematic diagrammatic representation of query data signals of different detection sensors of FIG. 1 and of an authentication response signal of an authorizing authentication element.

FIG. 2 shows four signal diagrams, which are time-synchronously situated above one another. The three uppermost diagrams reflect query data signals A1, A2, A3 of three different detection sensors, as they are emitted from their respective antenna unit; while the bottom diagram shows an authentication response signal of an authentication element. As illustrated, each of the detection sensors first sends, by way of its antenna in a synchronous manner, a carrier signal 2 to the communication. structure with an authentication element possibly situated in its acquisition range. When it is present in one or more of the acquisition ranges, the authentication element is reliably prompted, as represented by means of a residual carrier signal part 2a of the authentication response signal.

Following this communication structure part of the signals, a data protocol field is situated, which is used for antenna detection and which, in the query data signals A1, A2, A3, forms a sensor-specifically (or antenna-specifically) coded data protocol range. In the authentication response signal S the sensor specific coding of the query data signals is used to form a sensor-indicative data protocol range 4. Within the sensor-specifically coded data protocol range of its query data signal, each antenna unit sends an identification data block 3a, 3b, 3c in a time range which is specifically assigned to it, and which does not overlap with the time ranges of the identification data blocks of the other antenna units or detection sensors. As a function of its position inside the vehicle 1 or in its environment, an authentication element receives precisely the identification data blocks of those detection sensors in whose acquisition range it is situated. By means of the time interval of the identification data block 3a, 3b, 3c characteristic of the respective detection sensors with respect to the preceding structure carrier signal 2, the authentication element, by means of corresponding devices, can identify the detection sensor or sensors in whose acquisition range it is situated. It then transmits this information directly back to the vehicle borne system part by incorporating specifically the received identification data blocks into the sensor-indicative data protocol field 4 of its authentication response signal.

For this purpose, it is assumed in the example of FIG. 2 that the authentication element is situated in the acquisition ranges of the three acquisition sensors whose query data signals are illustrated. Correspondingly, the authentication element incorporates the identification data blocks 3a, 3b, 3c of these three detection sensors in a time-corresponding manner into the sensor-indicative data protocol range 4 of its authentication response signal. As can be seen in the bottom diagram of FIG. 2, three additional block spaces 5 within the sensor-indicative data protocol field 4 remain vacant or contain a non-reception information; that is, it is assumed that the authentication element is not situated within the acquisition ranges of three additional existing detection sensors. An end block 6 will then represent the end of the sensor-indicative data protocol field 4 of the authentication response signal. The authentication element sends the information built-up in the sensor-indicative data protocol range 4 concerning the detection sensor or sensors from which it has received a query data signal, back to the on board vehicle system part which, by means of corresponding devices, can identify therefrom the acquisition range or ranges of its detection sensors within which the responding authentication element is situated.

Subsequently, the actual authentication operation will then take place; that is, the examination of whether an authentication element is involved which provides an authorization for the respective vehicle 1. For this purpose, a bidirectional data exchange takes place between the on board vehicle system part by way of at least one of the antenna units in whose acquisition range the authentication element was recognized, and the authentication element. In the example of FIG. 2, the vehicle borne system part carries out the authentication communication by way of that antenna unit which is part of the second query data signal diagram from the top. The authentication communication starts with the sending of an identification information 7 by the vehicle-side system part. The authentication element responds to it in its authentication response signal with a response identification information 8.

Then, the actual authorization examination takes place by using a (preferably highly secure) cryptographic process, for example, by using a hash function or another so-called one-way function. For this purpose, the vehicle borne system part sends a random number information 9 to the authentication element which responds by means of a hash function value 10 which is determined by using the received random number information 9 and which can be analyzed in the vehicle borne system part in a manner known per se with respect to whether the concerned authentication element is valid for this vehicle; that is, whether the user carrying the authentication element is authorized to enter the vehicle or possibly use it. Accordingly, depending on whether or not the authentication element was recognized as authorized, the vehicle-side system part generates corresponding locking control commands or optionally drive blocking commands.

As illustrated in the example of FIG. 2, a single generation of the authentication response signal by a detected authentication element provides a sufficient authentication element searching operation in the case of the locking system according to the invention. That is, on the part of the authentication element, the sensor-indicative data protocol field 4 needs be sent only once per searching operation, which sensor-indicative data protocol range contains, in the form of the sensor-specific identification data blocks, the information concerning those detection sensors from which it has received the query data signals. Likewise, a one-time authentication communication is sufficient with the vehicle borne system part concerning one of the detection sensors in whose acquisition range the authentication element is situated. This response of the authentication element per searching operation which is therefore required only once minimizes its energy consumption and, if the authentication elements is fed by a battery, increases the life of the battery. At the same time, compared to conventional systems with a serial acquisition range query by means of the different detection sensors, the duration of the authentication element searching operation is significantly reduced, because the sensor-specific identification data blocks can be kept much shorter than the authentication protocol part. Thus, the signal length of the data protocol part used for the antenna detection (that is, of the sensor-specifically coded data protocol range of the query data signals emitted on the vehicle) and of the sensor-indicative data protocol range 4 of the authentication response signal sent by the authentication element, is still clearly shorter than full authentication communication operations between the different vehicle borne detection sensors and the authentication element which are sequentially connected without such a data protocol part.

It is understood that the locking system according to the invention can be used not only for securing vehicles but also any other objects, including stationary objects, in which one or more access elements are secured by a locking system having locking control devices whose activation requires the presence of an authorizing authentication element. Its authorization by the locking control devices is examined by a wireless authentication communication. Although a main application field of the invention is keyless go systems, it is also suitable for other electronic locking systems, for example, those with keys to be operated manually.

In addition, the invention can be used not only for locking systems but also for other safety systems in which the type of the respectively generated safety control command is a function of the position of the detected authentication element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic safety system, comprising:
   a plurality of safety units having control devices associated therewith and being adapted to be arranged on an object to be secured;
   at least one authorizing authentication element; and
   a plurality of authentication element detection sensors, each having a signal sending device for emitting a query data signal within a corresponding acquisition range, which query data can be received by an authentication element situated in the corresponding acquisition range, the authentication element having devices for returning an authentication response signal; wherein
       query data signals emitted by the authentication element detection sensors contain a data protocol field coded with sensor-specific identification information; and
       each authentication element has devices for analyzing the data protocol field of received query data signals coded with sensor-specific identification information, and for generating an authentication response signal which contains a sensor-indicative data protocol field that can be analyzed by the control devices, which data protocol field is coded with information that identifies each detection sensor from which the authentication element has received a query data signal.

2. The electronic safety system according to claim 1, wherein, the data protocol field of a respective query data signal coded with sensor-specific identification information contains an identification data block which, for the different detection sensors, is situated at different points within the data protocol field.

3. The electronic locking system according to claim 2, wherein:
   the identification data blocks of different detection sensors are situated at mutually separated points within the data protocol field coded with sensor-specific identification information; and
   the sensor-indicative data protocol field of the authentication response signal is composed of data signal blocks which, in their data protocol position, correspond to that of a respectively pertaining identification data block of received query data signals.

4. A method for operating a safety system having a plurality of sensor units, each of which monitors an associated acquisition range by emitting a query signal to detect presence of an authorization element within its respective acquisition range, comprising:
   each sensor unit emitting a query signal having a unique code which identifies the sensor unit that emitted the query signal;
   the authorization element receiving query signals from each sensor unit within whose acquisition range the authorization element is situated; and
   in response to receipt of said query signals, the authorization element sending a single authentication response signal which identifies each sensor unit from which a query was received, based on the unique codes contained in received query signals.

5. The method according to claim 4, wherein
   each query signal contains an identification block containing said unique code which identifies the sensor unit which emitted the query signal; and
   the single authentication response signal contains a corresponding identification block which cumulates unique code information from the identification blocks of received query signals.

6. The method according to claim 5, wherein
   query signals are emitted by said sensor unit in time synchronization;
   each sensor unit transmits its unique code in a predetermined time segment within the identification block of its query signal; and
   predetermined time segments for the respective safety units are staggered in time.

7. The method according to claim, 6 wherein said identification block of said authentication response signal includes each received unique code, in the time same segment in which it was transmitted by a sensor unit which it identifies.

8. An electronic safety system, comprising:
   an authorization authentication element; and
   a plurality of sensor units, each for monitoring a respective geographic area associated therewith, to detect presence of said authorization authentication element therein, at least some of said geographic areas overlapping each other in part; wherein
       each said sensor unit has means for emitting a query data signal within the geographic area associated therewith;
       the query data signal emitted by each sensor unit contains a data protocol field coded with a unique identification information that designates the sensor unit that transmitted said query data signal;
       the authorization authentication element has devices for receiving query data signals from said sensor units, and for generating an authentication response signal that contains a data protocol field coded with information that identifies each sensor unit from which a query data signal has been received.

* * * * *